United States Patent
Ranucci et al.

(10) Patent No.: US 9,403,510 B2
(45) Date of Patent: Aug. 2, 2016

(54) TEMPORARY SCRUBBING APPENDAGE FOR A WINDSHIELD WIPER ASSEMBLY

(71) Applicants: Dean Randolph Ranucci, Monroe, MI (US); Peter William Ranucci, Glen St. Mary, FL (US)

(72) Inventors: Dean Randolph Ranucci, Monroe, MI (US); Peter William Ranucci, Glen St. Mary, FL (US)

( * ) Notice: Subject to any disclaimer, the term of this patent is extended or adjusted under 35 U.S.C. 154(b) by 0 days.

(21) Appl. No.: 14/202,542

(22) Filed: Mar. 10, 2014

(65) Prior Publication Data

US 2014/0259508 A1  Sep. 18, 2014

Related U.S. Application Data

(60) Provisional application No. 61/789,630, filed on Mar. 15, 2013.

(51) Int. Cl.
*B60S 1/38* (2006.01)

(52) U.S. Cl.
CPC ............ *B60S 1/38* (2013.01); *B60S 2001/3831* (2013.01); *B60S 2001/3834* (2013.01); *B60S 2001/3836* (2013.01); *B60S 2001/3843* (2013.01)

(58) Field of Classification Search
CPC .. B60S 1/38; B60S 1/0497; B60S 2001/3827; B60S 2001/3834; B60S 2001/3831; B60S 2004/3843; B60S 2001/4061; B60S 2001/3832; B60S 1/0491; B60S 1/3836
USPC .............. 15/250.48, 250.361, 250.41, 250.4, 15/245, 245.1
See application file for complete search history.

(56) References Cited

U.S. PATENT DOCUMENTS

| | | | | |
|---|---|---|---|---|
| 2,179,454 A * | 11/1939 | Paulus | .................... | 15/250.4 |
| 3,238,555 A * | 3/1966 | Cels | .................... | 15/250.04 |
| 3,545,028 A * | 12/1970 | Poland | .................... | 15/250.48 |
| 3,631,561 A * | 1/1972 | Aszkenas | .................... | 15/250.41 |
| 3,828,388 A * | 8/1974 | Fuhr | .................... | 15/250.41 |
| 4,208,758 A * | 6/1980 | Timmis et al. | ............. | 15/250.04 |
| 4,293,975 A * | 10/1981 | Ainsworth | ............... | 15/250.41 |
| 4,339,839 A * | 7/1982 | Knights | .................... | 15/250.04 |
| 5,048,146 A * | 9/1991 | Cavenago | ................. | 15/250.48 |
| 5,432,973 A * | 7/1995 | Wagner et al. | ............... | 15/210.1 |

(Continued)

FOREIGN PATENT DOCUMENTS

| | | |
|---|---|---|
| DE | 4141603 A1 * | 9/1993 |
| DE | 10250874 A1 * | 2/2004 |
| WO | WO80/01155 * | 6/1980 |

OTHER PUBLICATIONS

Machine translation of description portion of German publication 10250874, published Feb. 2004.*

*Primary Examiner* — Gary Graham
(74) *Attorney, Agent, or Firm* — Renner, Otto, Boisselle & Sklar, LLP

(57) ABSTRACT

The present invention is directed to a wiper brush appendage that easily attaches to a wiper blade to aid in the removal of compacted solids, insect remains, light frost and the like. The wiper brush appendage is an elongated member of pliable plastic, such as one of the varieties of thermoplastics. The invention has a slot on the top side that runs the entire length that easily spreads to allow it to encompass a wiper blade, as well as multiple rows of brush hairs along the underside. It has a specific inside pocket with inturned flanges and small depressions that put pressure on the wiper blade and limits the movement of the invention while in use. Once installed over the wiper, the user turns on the wiper assembly and the brushes scrub against the windshield.

10 Claims, 4 Drawing Sheets

(56) References Cited

U.S. PATENT DOCUMENTS

| | | | |
|---|---|---|---|
| 5,732,436 A * | 3/1998 | Feigenbaum | 15/250.41 |
| 6,760,951 B1 * | 7/2004 | Wynen et al. | 15/250.48 |
| 7,140,064 B1 * | 11/2006 | Woolstenhulme | 15/250.361 |
| 8,191,199 B2 * | 6/2012 | Miller | 15/250.22 |
| 2010/0146728 A1 * | 6/2010 | Sharabura et al. | 15/250.48 |
| 2012/0096667 A1 * | 4/2012 | Cooper | 15/250.48 |

* cited by examiner

TEMPORARY SCRUBBING APPENDAGE FOR A WINDSHIELD WIPER ASSEMBLY

CROSS-REFERENCE TO RELATED APPLICATIONS

Provisional Application No. 61/789,630, filed on Mar. 15, 2013

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

BACKGROUND OF THE INVENTION

1. Field of the Invention

The present invention generally relates to a windshield wiper assembly, and more particularly, to a device that is capable of temporarily being applied over a wiper blade that is attached to and supported by a part of the windshield wiper arm and whose function is the cleaning and removal of solids such as insect remains, bird droppings, light frost and other debris from the windshield.

In certain geographic locations and climates, it is common for airborne objects and other types of bugs and insects to collide with and become dried and compacted to the windshield of a vehicle. The accumulation of such bugs, insects and other debris on the windshield is greatest while the vehicle is in motion, but significant accumulation can also occur when the vehicle is stationary for long periods of time. This is particularly true of light frost from a cold evening, bird droppings and with vehicles parked under wooded areas. Removal of bugs, insects, light frost and other debris attached to the windshield is essential to ensure safe operation of the vehicle. This accumulation can significantly impair the driver's vision, especially during the night time hours.

Currently the most effective means of removing the accumulated bugs, insects and other debris is to hand wipe the windshield with a towel or scrubber combined with a solvent or cleaner. This method is not always convenient or is it feasible to have these supplies readily available when needed. It is normal practice to rely on the windshield wipers and additional windshield cleaner contained with the engine compartment to try to dislodge the accumulated solid materials. This is typically met with failure since windshield wipers are constructed of materials generally effective at the removal of water or other liquids, not compacted dried on solids. In such instances, it has been found that a brush-like device attached to the windshield wiper, with means to contour the convexness, or similarly, the flatness of the windshield, is most effective in removing bugs, insect remain, light frost and other debris attached or impacted thereon.

2. Description of Related Prior Art

Numerous designs for windshield wipers and their attachments have been provided in the prior art. Even though these designs may be suitable for the specific individual purposes to which they address, they would not be suitable for the purpose of the present option provide hereon. These prior art devices have several known drawbacks. Specifically, such devices do not accurately provide precise means for removing debris that have become attached the windshield, nor provide a durable, resilient option to the motorist.

Several prior art patents address the issue of adding a scrubbing sponge or brush like material in parallel or unison with traditional type wiper blades, as seen in U.S. Pat. No. 8,332,990, Windshield Wiper Blade and Suited for Removal of Solid Material, issued to Cooper on Dec. 12, 2012, and also U.S. Pat. No. 6,892,418 Windshield Wiper and Brush Assembly, issued to Stouder II on May 17, 2005. These two patents similarly combine windshield wiping and a scrubbing member for the removal of water and solid matter on the windshield. While these may work temporarily, eventually the wiper member, as well as the sponge or brush portion will wear and require replacement. The process of replacement of these portions is both time consuming and tedious. Another drawback to these issued patents is the bulky size. Due to the increased size of these wiper assemblies there is risk taken related to the visions of the driver being obscured during driving operation.

Similarly, U.S. Pat. No. 7,707,681 Windshield Wiper Clip and Bug Remover, issued to Cabak on May 4, 2010 and also U.S. Pat. No. 6,505,378 Wiper Assembly, issued to Squires on Jan. 14, 2003 are inherently comparable to one another. The two previously mentioned designs both aid in the use of clips to couple a scrubbing type member to a windshield wiper. Once the scrubbing member and clips are fastened to the wiper, said assembly articulates across the windshield cleaning both water and solid matter off the windshield. While these plastic clips are low cost and easy to manufacture, it is known by most that these plastic type clips are extremely prone to breaking or cracking with being stressed over each individual segment of the design or during articulation across the windshield. Furthermore, it is cumbersome to attempt to lean over the extremities of the automobile to try to accurately clip these design onto the windshield wipers.

Additionally, U.S. Pat. No. 3,906,583 Windshield Cleaning Device, issued to Murphy on Sep. 23, 1975 is a windshield cleaning device that includes a cleaning member that is of tubular design and provided with a surface of sponge or plastic mesh like material that aids in the use of arms inserted at each end that is then mounted on a windshield wiper blade. While, like the others, this design may be suitable for the specific purpose to which it addresses, it is not as easily usable due to the work involved in the attachment process as described within the prior art. Furthermore, U.S. Pat. No. 7,140,064 Disposable Scrubber Attachment for Wipers, issued to Woolstenhulme on Nov. 28, 2006 is temporarily attached to the windshield wiper for the removal of solid matter. This design uses a foam rubber V channel that is coupled to the blade of a wiper and then fastened to one another with the use of Velcro strips or plastic clips, or similar. Compared to the previously listed prior art, this design is by far more practical to the everyday user. The only obvious deficiencies within this design is the nylon mesh netting wrapped around the foam rubber will eventually become completely full of compacted matter and will then be non-effective for future cleanings and need to be disposed of. It will also only work to remove the smaller, less compacted solid material on the windshield. Equally, due to this design being disposable, it raises the cost to the end user of this product. Furthermore, the Velcro strips or other plastic mounting clips are just more added work that is not needed. Impacted solid material on a windshield of an automobile is an everyday occurrence, something that warrants a little more than a disposable, one time use option.

As such, it may be appreciated that there is a continuing need for a new windshield cleaning apparatus with means to remove bugs, insect remains, and other debris that are attached to a windshield. In these respects, the present invention substantially departs from the conventional concepts and designs of the prior art. By doing so, it provides an apparatus that significantly fulfills this need.

The present invention attains its intended purposes, objectives and advantages through a new useful and unobvious combination of installation procedures and component elements, with the use of a minimum number of functioning parts at a reasonable cost to manufacture and by employing only readily available materials.

BRIEF SUMMARY OF THE INVENTION

In view of the foregoing disadvantages inherent in the known types of wiper blades and their attachments now present in the prior art, the present invention provides a new inexpensive wiper brush appendage device that can be easily and temporarily applied over the wiper blade. This can be utilized for providing convenience for the user when removing bugs, light frost, insect remains and other debris from the windshield.

In the preferred embodiment, the wiper brush appendage is comprised of a generally longitudinal one piece pliable plastic material, such as one of the varieties of thermoplastics, having incorporated multiple rows of brush hairs that extends along the entire underside of the plastic material. Said wiper brush appendage also having along the crown a slot that runs the entire longitudinal length that opens up to a specific inside pocket with inturned flanges and small depressions with respect to the inside wall. Due to the flexible nature of the pliable plastics, the slot is able to be manipulated to accept a wide variety of wiper blade sizes belonging to a windshield wiper assembly and is strong enough to stay in place once fully applied over the wiper assembly, and also having the ability to be easily cut to size to accommodate different length wiper assemblies. Said wiper brush appendage is capable of flexing to which would allow the invention to contour to the curvature of a windshield. The present invention allows the user to clean debris anytime and in any location that permits them to bring the vehicle to a rest and install the wiper brush appendage. Once the wiper brush appendage is installed, it is operated in the same manner as a typical windshield wiper assembly. The user can apply conventional windshield washer fluid to further loosen the debris.

In an alternate variation, the same generally longitudinal one piece pliable plastic material has more of a specific straight wall inside U-shape pocket, which due to the nature of the soft plastics, the walls of this variation slightly fold in on itself. The U-shape inside pocket accepts a wider variety of wiper assemblies and maintains the connection to the assembly due to the force that the wiper arm exerts on the windshield. Similar to the preferred embodiment, this wiper brush appendage incorporates a brush either by adhesively bonding, within the molding process, or by other mechanical means. This alternate representation is intended to not only make the installation easier, but to make the union of the wiper brush appendage to the varying wiper assemblies much more comprehensive.

The present invention is distinguished from prior art in that, since the wiper brush appendage is intended to be used temporarily while the automobile is in a stationary position it will not obscure the vision on the driver during operation, as well due to its temporary use and the durability of the brush it shall need not be replaced, further keeping the cost down to the user. Furthermore, the wiper brush appendage differs in that there are no harden plastic clips, or other objects, that could crack during the installation process, as well as due to the nature of the longitudinal opening along the back, it is easily installed from one side of the vehicle with minimal force or movement required from the user. Lastly, the wiper brush appendage separates itself from the prior art in that it uses brush hairs to aid in the removal of the impacted debris versus the use the softer sponge like material. Once the windshield is sufficiently cleaned, the wiper brush appendage can be easily removed and stored for future use.

Other objects, features and advantages of the present non-obvious invention will become apparent from the following detailed description taken in conjunction with the accompanying drawings.

BRIEF DESCRIPTION OF THE DRAWINGS

The foregoing and other objects, features and advantages of the invention will become more fully understood from the following description of the preferred embodiment of the invention and as illustrated in the accompanying drawings in which, like reference characters refer to the same parts throughout different views. The drawings are not necessarily to scale, with emphasis instead being placed upon illustrating the principles of the invention.

Figure 1:
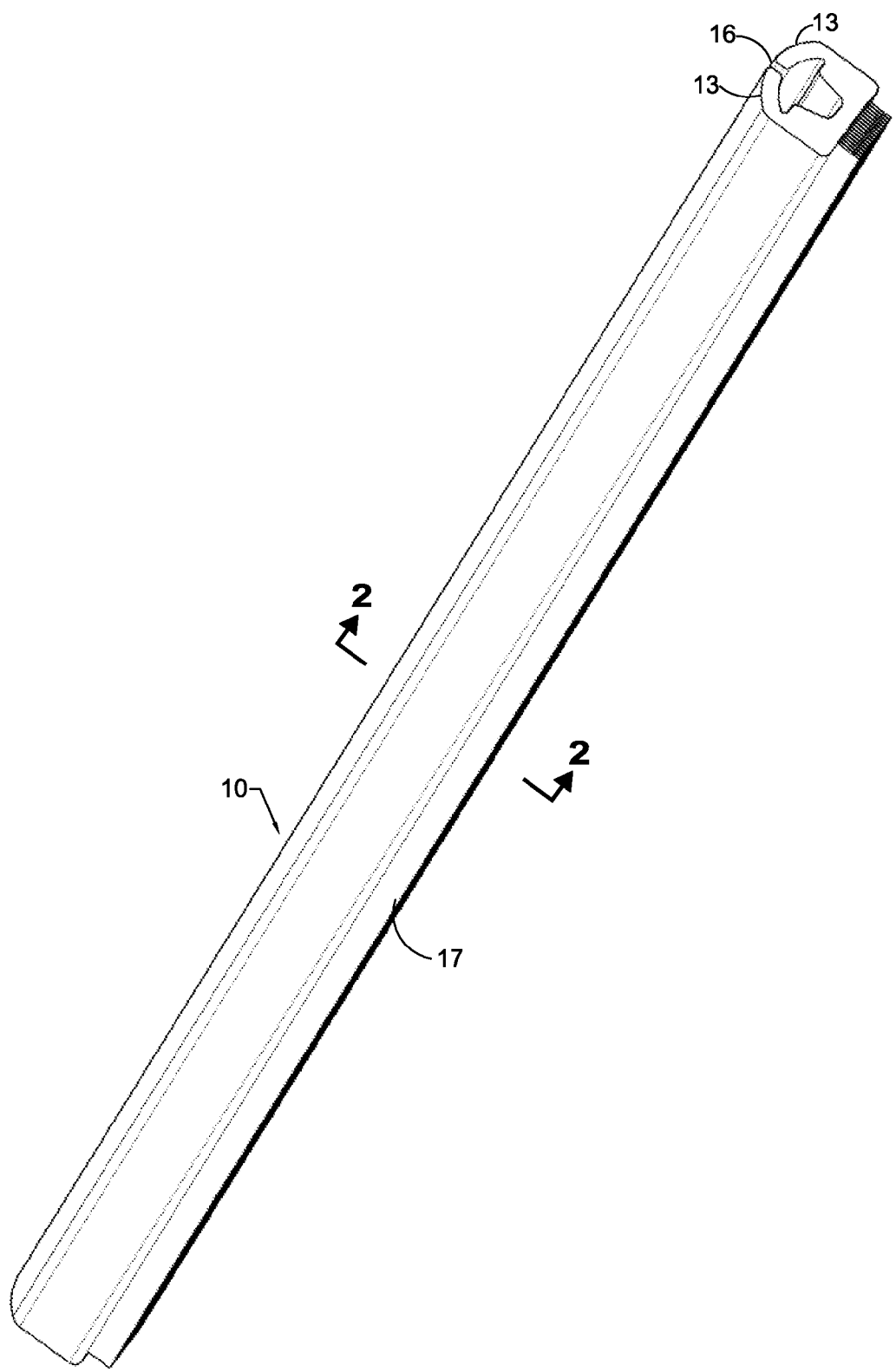
FIG. 1 is a perspective view of the wiper brush appendage in accordance with one embodiment of the present invention.

While the invention is amenable to various modifications and alternative forms, specifics thereof have been shown by way of example in the drawings and will be described in detail. It should be understood however, that the intention is not necessarily to limit the invention to the particular embodiments described, but to cover all modifications and alternatives falling within the spirit and scope of the invention defined.

DETAILED DESCRIPTION OF THE INVENTION

Reference is hereby made to the following attached drawings. Like reference numerals are used throughout the drawings to portray like or similar elements of the wiper brush appendage. For the purposes of presenting a brief and clear description of the present invention, the preferred embodiment will be discussed as used for the cleaning and removal of solids from the surface of an automobile windshield, or similar. The figures are intended for representative purposes only and should not be considered to be limiting in any respect.

Figure 2:
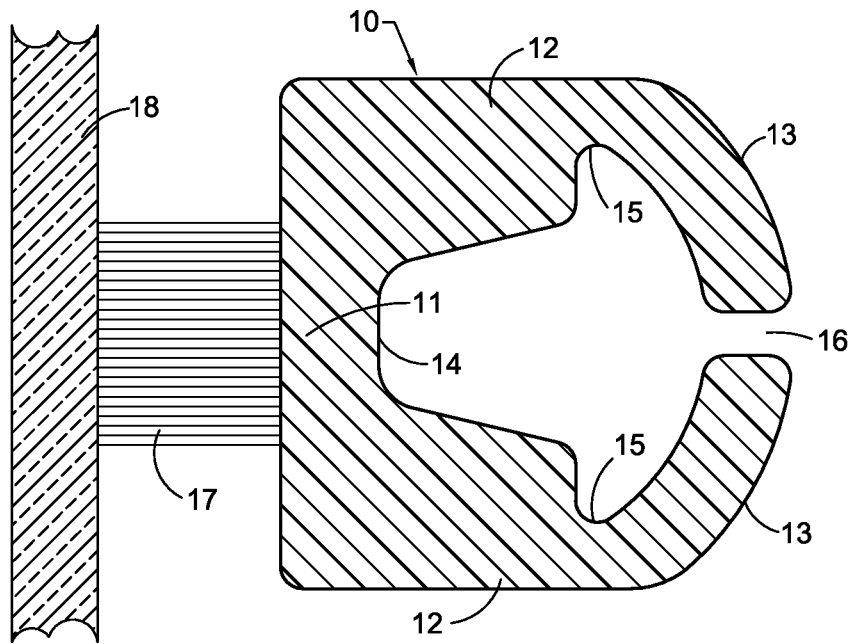
FIG. 2 is an enlarged cross sectional view of the present invention showing the wiper brush appendage with inside channel with curved depressions and underside brush hairs.

Referring now to FIG. 1, there is shown a perspective view of the present invention, in the preferred embodiment, generally designated 10 and comprises of an elongated portion with an inside pocket, as seen in FIG. 2, having also longitudinal running brush hairs 17 the entire length of the base of the wiper brush appendage (herein referred to as the "device") 10. The device 10 also includes a longitudinal slot 16 disposed in the rounded crown portion 13 that thereof whereby allowing the windshield wiper blade to be inserted into and substantially enclosed within the slot 16.

The device 10 should be constructed from material in the plastics family. As such, the material is extremely pliable and therefore easily contoured to fit its application. Since there is a need for scrubbing action the brush hairs 17 shall be made from a material that is compatible with the plastics used in the device 10.

Referring now to FIG. 2, a cross-sectional view of the device 10 is shown, disclosing the structure of the overall device 10 and its engagement to the windshield wiper assembly. Some time should be taken now to quickly explain the windshield wiper assembly. The assembly would typically apply the wiper motor typically housed within the engine compartment, the arm that that connects at one side to the wiper motor and to the other side at the wiper housing. The wiper housing holds the wiper blade which makes contact to the windshield. The device 10 consists of a solid base portion 11 and corresponding outer walls 12 which are formed integral with the base portion 11 and extend from an inner bottom convergence 14 thereof in diverging relation to one another. The outer walls 12 at their outer edges are provided with corresponding curved depressions 15 which are almost vertical with respect to the cross section, and commence a curved pocket towards the crown 13 of the device 10.

Extending from the solid base portion 11 the outer walls 12 extend outward towards the curved crown 13 of the device 10. Centered at the peak of the crown 13 is a slot 16 that extends the entire longitudinal distance of the device 10. Due to the extreme flexibility of the plastic material, the slot 16 is able to be flexed open to allow the insertion of a wide variety of wiper blades as shown and later described in FIG. 4 and FIG. 5.

The outer walls 12 disposed in opposed relation to one another diverge to the solid base portion 11 of the device 10 and give way to the brush hairs 17 that run parallel along the entire length of the underside of the device 10. In the preferred embodiment, the brush hairs 17 are connected to the solid base 11 during the molding process of the device 10, adhesively bonded, or connected by other mechanical means. Once the device 10, is positioned over the windshield wiper by way of the slot 16, said brush hairs 17 are now in contact with the windshield 18 of the vehicle that is using the device 10.

Once the device 10 encompasses the windshield wiper and the driver engages the windshield wiper assembly, the device 10 and the wiper assembly articulate in harmony across the windshield 18. Since the construction of the device is a flexible material in allowing the device 10 to contour to the windshield 18, by which allowing the brush hairs 17 to make contact to the windshield 18. The back and forth motion of the wiper assembly will force the brush hairs 17 to scrub the windshield 18, thus, removing solids, such as insect remains, bird droppings, light frost, and other debris. Since the device 10 is removably affixed to the automobile, or the like, via the slot 16 that engages the windshield wiper, it can be easily removed when finished.

It is known that not all wiper assemblies are equal lengths, the plastic construction of the device 10 allows the user to freely measure ones existing windshield wiper length and by use of any ordinary cutting instrument, cut the device 10 to the specified length, thereby allowing the device 10 to be used by many. The current specified construction also allows the device 10 to have great longevity for the user.

Figure 3:
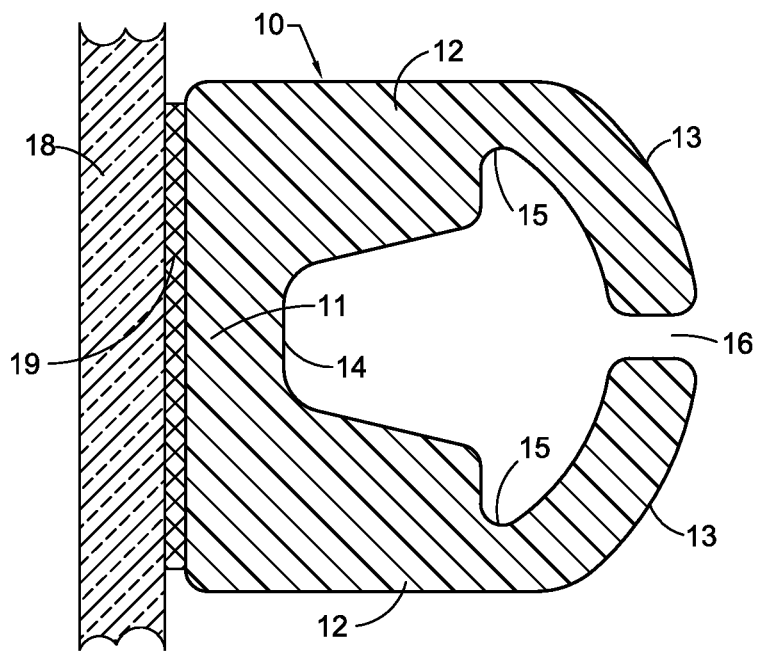
FIG. 3 is an enlarged cross sectional view of a further aspect showing the wiper brush appendage with inside channel with curved depressions and underside hook-end loop device, such as Velcro, to be utilized for scrubbing.

FIG. 3 illustrates a further embodiment of the present invention. Having an inherently similar design as seen in FIG. 2, the outer walls 12 disposed in opposed relation to one another diverge to the solid base portion 11 of the device 10 and give way to a hook-end loop device 19, such as Velcro, utilized as the scrubbing instrument that runs parallel along the entire length of the underside of the device 10. The hook-end loop device 19 is connected to the solid base 11 during the molding process of the device 10, adhesively bonded, or connected by other mechanical means. Once the device 10, is positioned over the windshield wiper by way of the slot 16, said hook-end loop device 19 is now in contact with the windshield 18 of the vehicle.

Figure 4:
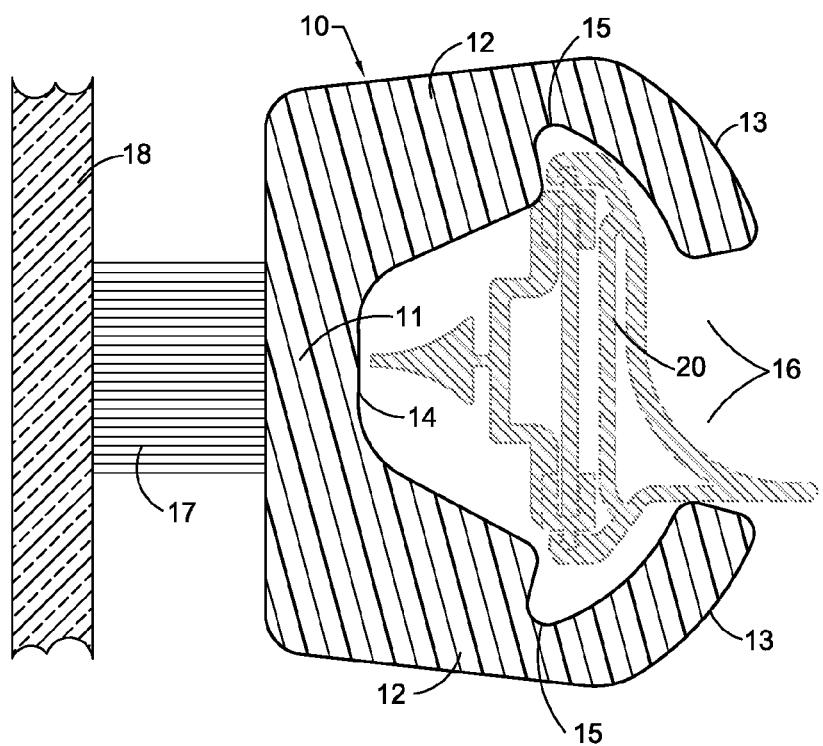
FIG. 4 is a cross section of the wiper brush appendage illustrating the flexibility of the soft plastic construction and its versatility of attachment to a variety of prior art windshield wiper assembly.
Figure 5:
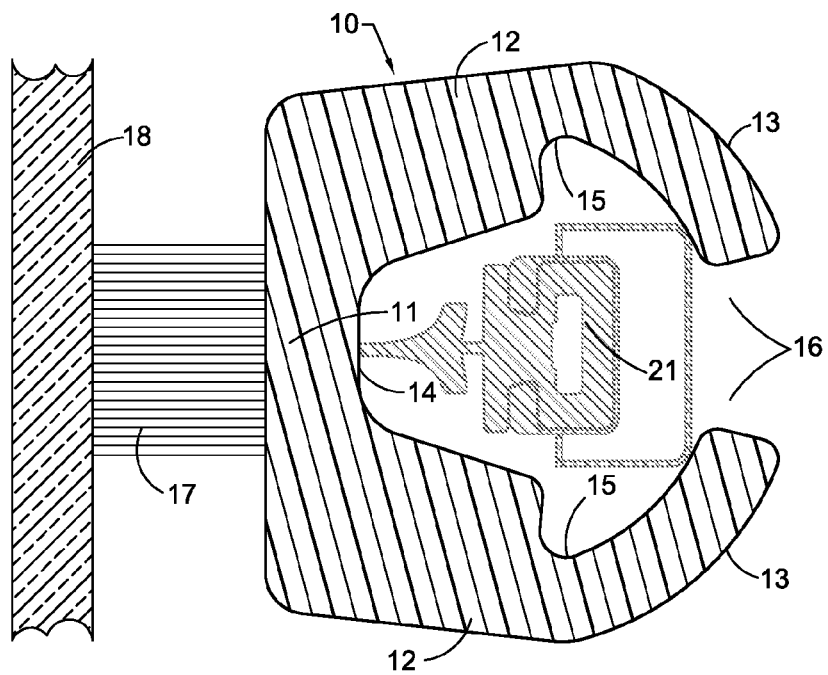
FIG. 5 is a cross section of the wiper brush appendage further illustrating the flexibility of the soft plastic construction and its versatility of attachment to another variety of prior art windshield wiper assembly.

Not all wiper blades or their assemblies are manufactured the same. FIGS. 4-5 showcase the ability of the device 10 to be used in just a couple different varieties of wiper blades. More specifically, FIG. 4 portrays the flexibility of the device 10 encompassing a newer style wider prior art wiper blade 20. As the slot 16 is stretched to accommodate the wiper 20 the inner bottom convergence 14 remains relatively unchanged and the outer walls 12 are spread horizontally in relation to the longitudinal shape of the device to mate with the wiper 20. The curved depression 15 then latch onto and clasp the wider wiper blade 20. The curved depression 15 transfers enough force to maintain the device 10 in the identical position while in use. Concomitantly, FIG. 5 displays the versatility of the device 10 being applied to yet another prior art windshield wiper 21, this wiper 21 being more of the older conventional style. The substructure of the crown portion 13 engulfs the wiper 21 and part of its lower housing, thereby maintaining enough pressure against the housing to keep the device 10 mated to the wiper during operation.

In knowing that not all wiper assemblies are the same, there is an alternate variation of the preferred embodiment that will allow a broader range of wiper blades and their assemblies to fit more generally into the Device 10. This alternate variation is shown in FIG. 6 and is now described as follows.

Figure 6:
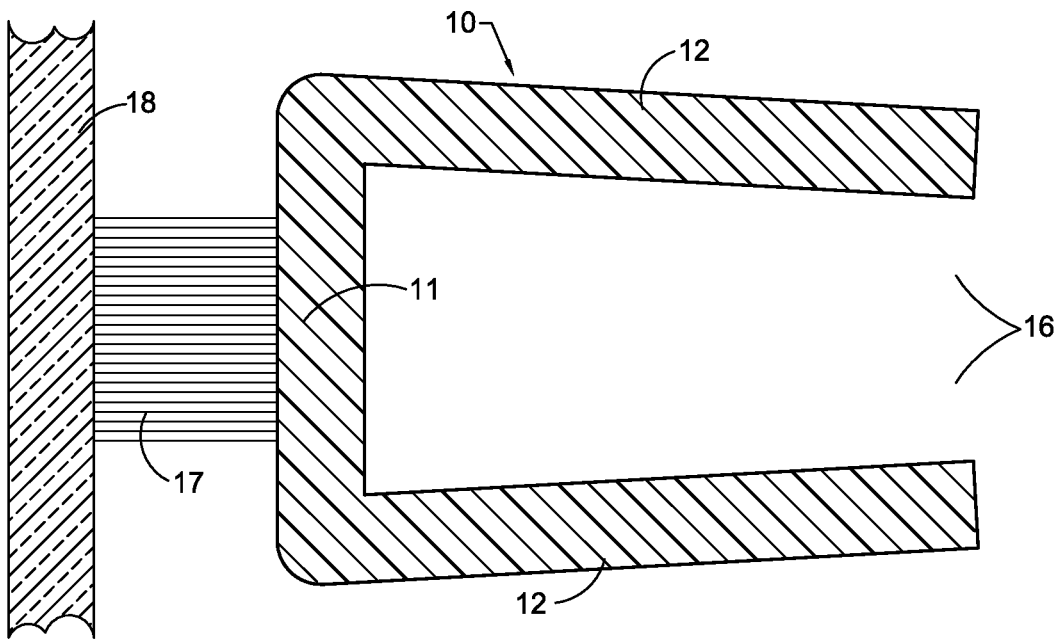
FIG. 6 is an enlarged cross section of another alternate variation of the wiper brush appendage showing a straight wall inside 3-sided substantially rectangular pocket and underside brush hairs.

FIG. 6 is a cross-sectional view of the device 10 showing the straight outer walls 12 disposed in opposed relation to one another on an outward slant diverging to the solid base portion 11 of the device 10. The device 10 also includes a wider longitudinal slot 16 disposed in opposed relation to the solid base portion 11. The wider slot 16 that extends the entire length of the device 10 allows a very wide range of wiper blade to mate with the device 10. The scrubbing action provided on this view is performed with the brush hairs 17 provided on the underside of the solid base portion 11. Once the device is positioned over the windshield wiper by way of the slot 16, the downward force of the wiper arm allows the brush hairs 17 to make constant contact with the windshield 18 of the vehicle.

Figure 7:
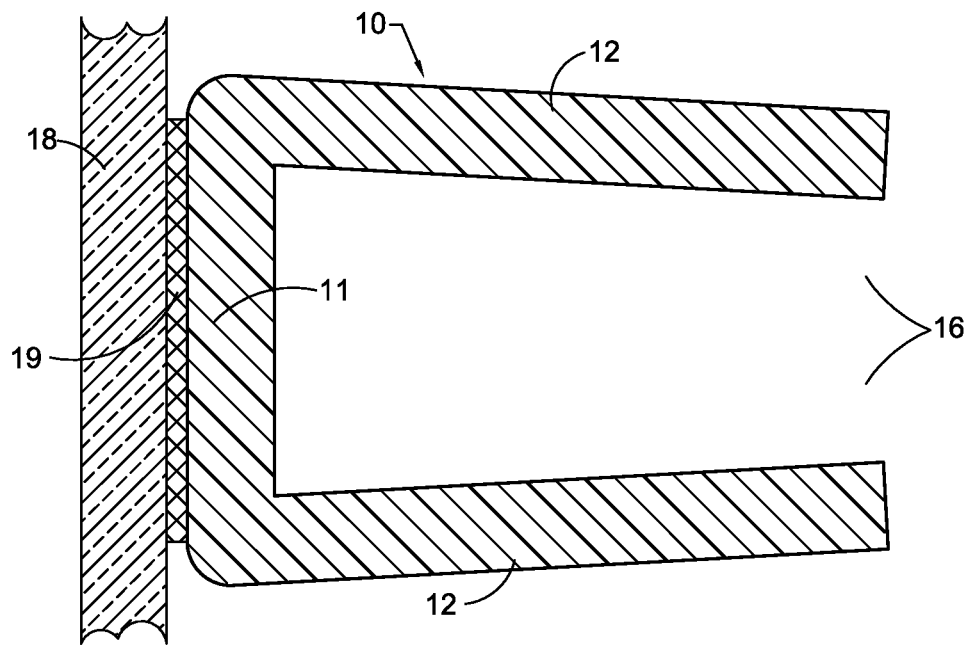
FIG. 7 is an enlarged cross section of another alternate variation of the wiper brush appendage showing a straight wall inside 3-sided substantially rectangular pocket and underside hook-end loop device, such as Velcro, to be utilized for scrubbing.

FIG. 7 illustrated a further embodiment of the present variation of the invention. Having an inherently similar design as seen in FIG. 6, the straight outer walls 12 disposed in opposed relation to one another on an outward slant diverging to the solid base portion 11 of the device 10. Positioned on the underside of the solid base portion 11 is a hook-end loop device 19, such as Velcro, utilized as the scrubbing instrument. The hook-end loop device 19 runs the entire longitudinal span of the device 10. This variation has the hook end loop device 19 make contact with the windshield 18 in the exact same manner described in FIG. 6.

While these versions of the invention have been illustrated and described in detail in the drawings and foregoing description, the same is to be considered as illustrative and not restrictive in character, it being understood that only the preferred embodiment and alternate variation have been shown and described and that all changes and modifications that come within the spirit of the version of the invention are desired to be protected. With respect to the above description then, it is to be realized that the optimum dimensional relationships for the parts of the invention, to include variations in size, materials, shape, form, function and manner of operation assembly and use, are deemed readily apparent and obvious to one skilled in the art, and all equivalent relationships to those illustrated in the drawings and described in the specifications are intended to be encompassed by the present invention.

From the foregoing, it will be understood by person skilled in the art that an improved temporary windshield wiper scrubber with means to remove solids, such as insect remains, bird droppings, light frost and other debris, from the windshield has been provided. Although the invention is relatively simplistic in design it holds a certain degree of difficulty in being designed to accommodate a variety of windshield wipers. The descriptions provided shall be considered illustrative and let it be known that numerous modifications and changes will readily occur to those skilled in the art, it is not desired to limit the invention to the exact construction and operation shown and described, and accordingly to suitable modifications and equivalents may be resorted to, falling within the scope of the invention.

What is claimed is:

1. A temporary wiping assembly comprising:
   a reusable scrubbing appendage for supplemental use on a wiper assembly, comprising:
      an elongated portion of pliable plastic having a crown which includes a slot extending an entire longitudinal length of the crown that opens to a 3 sided substantially rectangular pocket forming an inside channel that allows the appendage to fully engulf the wiper assembly; and
      a pair of inwardly angled inwardly facing walls that form the crown, wherein the inwardly angled inwardly facing walls resist movement radially outwardly, thereby inwardly forcing the wiper assembly to secure the wiper assembly within the 3 sided substantially rectangular pocket when the wiper assembly is placed within the inside channel against the inwardly facing walls;
      wherein said elongated portion of pliable plastic includes a flat wide underside with a scrubbing instrument extending an entire longitudinal length and width, of the elongated portion, that makes contact with a vehicle windshield when the scrubbing instrument is at rest against a windshield and when the scrubbing instrument is scrubbing the windshield; and
   a wiper blade of the wiper assembly held within the inside channel such that the inwardly facing walls inwardly force the wiper assembly to secure the wiper assembly within the 3 sided substantially rectangular pocket when the wiper assembly is placed within the inside channel against the inwardly facing walls.

2. The temporary wiping assembly according to claim 1, wherein said elongated portion of pliable plastic includes the flat wide underside with the scrubbing instrument including multiple lines of brush hairs extending the entire longitudinal length and width, of the elongated portion, that makes contact with the vehicle windshield.

3. The temporary wiping assembly according to claim 1, wherein said elongated portion of pliable plastic includes the underside with the scrubbing instrument including a hook-end loop device extending the entire longitudinal length and width, of the elongated portion, that makes contact with a vehicle windshield.

4. The temporary wiping assembly according to claim 1, is selected from a material from the group consisting of a thermoplastic, rubber, or silicon.

5. The temporary wiping assembly according to claim 1, wherein the scrubbing instrument includes a plurality of filaments.

6. A vehicle including the temporary wiping assembly of claim 1, further comprising a windshield for receiving the scrubbing instrument.

7. The temporary wiping assembly according to claim 1, wherein the inwardly facing walls extend from a base of the elongated portion to form an outward facing concavity, which forms a portion of the 3 sided substantially rectangular pocket and which extends along a length of the base, for receiving the wiper assembly.

8. The temporary wiping assembly according to claim 1, wherein the elongated portion has a U-shape cross-section.

9. A method of cleaning a windshield, comprising:
   providing a reusable scrubbing appendage for supplemental use on a wiper assembly comprising:
      an elongated portion of pliable plastic having a crown which includes a slot extending an entire longitudinal length of the crown that opens to a 3 sided substantially rectangular pocket forming an inside channel that allows the appendage to fully engulf the wiper assembly; and
      a pair of inwardly angled inwardly facing walls that form the crown, wherein the inwardly angled inwardly facing walls resist movement radially outwardly, thereby inwardly forcing the wiper assembly to secure the wiper assembly within the 3 sided substantially rectangular pocket when the wiper assembly is placed within the inside channel against the inwardly facing walls;
      wherein said elongated portion of pliable plastic includes a flat wide underside with a scrubbing instrument extending an entire longitudinal length and width, of the elongated portion, that makes contact with a vehicle windshield when the scrubbing instrument is at rest against a windshield and when the scrubbing instrument is scrubbing the windshield; and
   inserting a wiper blade of the wiper assembly into the inside channel;
   securing the wiper within the inside channel such that the inwardly facing walls inwardly force the wiper assembly to secure the wiper assembly within the 3 sided substantially rectangular pocket when the wiper assembly is placed within the inside channel against the inwardly facing walls;
   engaging the scrubbing instrument of the temporary reusable scrubbing appendage with the windshield, wherein the scrubbing instrument is the only portion of the temporary reusable scrubbing appendage that engages with the windshield when scrubbing.

10. The method of cleaning a windshield of claim 9, further comprising removing the temporary reusable scrubbing appendage from the wiper assembly after scrubbing the windshield with the scrubbing instrument, and storing the temporary reusable scrubbing appendage for later reuse.

* * * * *